(12) United States Patent
Lee et al.

(10) Patent No.: US 9,817,386 B2
(45) Date of Patent: *Nov. 14, 2017

(54) JOINT GUARANTEE SYSTEM FOR VEHICLE ASSEMBLY AND CONTROL METHOD OF THE SAME

(71) Applicant: Hyundai Motor Company, Seoul (KR)

(72) Inventors: Jaehyun Lee, Seoul (KR); Sung Phil Ryu, Seoul (KR)

(73) Assignee: Hyundai Motor Company, Seoul (KR)

( * ) Notice: Subject to any disclaimer, the term of this patent is extended or adjusted under 35 U.S.C. 154(b) by 545 days.

This patent is subject to a terminal disclaimer.

(21) Appl. No.: 14/327,276

(22) Filed: Jul. 9, 2014

(65) Prior Publication Data

US 2015/0018999 A1    Jan. 15, 2015

(30) Foreign Application Priority Data

Jul. 9, 2013   (KR) .................. 10-2013-0080401

(51) Int. Cl.
*G05B 19/402*   (2006.01)
*G05B 19/418*   (2006.01)

(52) U.S. Cl.
CPC ..... *G05B 19/402* (2013.01); *G05B 19/41805* (2013.01); *G05B 2219/31034* (2013.01);
(Continued)

(58) Field of Classification Search
CPC ............ G05B 19/402; G05B 19/41805; G05B 2219/36371; G05B 2219/31034; G05B 2219/45018
See application file for complete search history.

(56) References Cited

U.S. PATENT DOCUMENTS

2006/0167587 A1*   7/2006   Read .................. B23Q 9/00
                                              700/245
2008/0235970 A1*  10/2008   Crampton .......... B25J 13/088
                                              33/503
(Continued)

FOREIGN PATENT DOCUMENTS

CN       201364486 Y       12/2009
JP       07-315266         12/1995
(Continued)

OTHER PUBLICATIONS

RFID driven robotic assembly for random mix manufacturing. Article. [online]. Sotiris, 2011 [retrieved on Feb. 14, 2017]. Retrieved from internet: <URL: http://www.sciencedirect.com/science/article/pii/S0736584511001311>.*
(Continued)

*Primary Examiner* — Robert Fennema
*Assistant Examiner* — Marzia T Monty
(74) *Attorney, Agent, or Firm* — Mintz Levin Cohn Ferris Glovsky and Popeo, P.C.; Peter F. Corless

(57) ABSTRACT

A joint guarantee system for vehicle assembly is applied to a vehicle assembly line that assembles an assembling object to a vehicle carried through on a conveyer line as an assembling element, and includes a vehicle detector that detects the vehicle entering the conveyer line, tool detectors disposed along the conveyer line that detect a position of an assembling tool on the conveyer line, an inertial sensor module installed in the assembling tool that detects an angle and a displacement of the assembling tool for an assembling point of the vehicle and the assembling object, a tool controller that applies control signals corresponding to a predetermined assembling point of the vehicle and the assembling object, a kind of assembling element, and assembling torque of the assembling tool, to the assembling tool, (Continued)

and a main controller that processes and stores the above information.

18 Claims, 6 Drawing Sheets

(52) U.S. Cl.
CPC .............. *G05B 2219/36371* (2013.01); *G05B 2219/45018* (2013.01)

(56) References Cited

U.S. PATENT DOCUMENTS

| | | | |
|---|---|---|---|
| 2011/0087360 A1* | 4/2011 | Chen | B25J 9/1697 700/114 |
| 2011/0106311 A1* | 5/2011 | Nakajima | B25J 9/1697 700/253 |

FOREIGN PATENT DOCUMENTS

| | | |
|---|---|---|
| JP | 2686977 B2 | 12/1997 |
| JP | 2008-000892 | 1/2008 |
| KR | 10-2001-0059240 A | 7/2001 |

OTHER PUBLICATIONS

RFID-enabled real-time wireless manufacturing for adaptive assembly planning and control. Article. [online]. George, 2008 [retrieved on Feb. 14, 2017]. Retrieved from internet: <URL: http://link.springer.com/article/10.1007/s10845-008-0121-5>.*

Ultra Wide-Band Localization and SLAM: A Comparative Study for Mobile Robot Navigation. Article. [online]. Marcelo, 2011 [retrieved on Feb. 14, 2017]. Retrieved from internet: <URL: https://www.ncbi.nlm.nih.gov/pmc/articles/PMC3274006/>.*

* cited by examiner

JOINT GUARANTEE SYSTEM FOR VEHICLE ASSEMBLY AND CONTROL METHOD OF THE SAME

CROSS-REFERENCE TO RELATED APPLICATION

This application claims under 35 U.S.C. §119(a) priority to and the benefit of Korean Patent Application No. 10-2013-0080401 filed in the Korean Intellectual Property Office on Jul. 9, 2013, the entire contents of which are incorporated herein by reference.

BACKGROUND (a) Field of the Invention

The present invention relates to a vehicle assembly system, and more particularly, to a joint guarantee system for vehicle assembly and a control method of the same capable of managing an assembling history of components for a vehicle in an assembly line in which the components are assembled to the vehicle.

(b) Description of the Related Art

Generally, in vehicle manufacturing, tens of thousands of components are assembled by many welding and assembling processes in mass production until the vehicle is produced.

Particularly, most of the operations performed in a design process among the production processes of a complete vehicle are processes of assembling various components to the vehicle by using coupling members such as bolts and nuts.

Since the assembling processes are directly related to quality indexes of the vehicle that may be noticed by a consumer, such as durability or silence of the complete vehicle, thorough assembling history management of the components for the vehicle is required.

However, even though importance of the assembling history management of the components is recognized in the art, previous attempts with respect to assembling history management have not been effective due to technical limitations.

The above information disclosed in this Background section is only for enhancement of understanding of the background of the invention and therefore it may contain information that does not form the prior art that is already known in this country to a person of ordinary skill in the art.

SUMMARY

The present invention discloses a joint guarantee system for vehicle assembly and a control method of the same having advantages of promoting assembling history management with high effectiveness by precisely recognizing positions of a vehicle and an assembling tool in an assembly line of the vehicle.

An exemplary embodiment of the present invention provides a joint guarantee system for vehicle assembly of a vehicle assembly line that assembles an assembling object to a vehicle carried through a conveyer line as an assembling element, the system including: a vehicle detector installed in the assembly line and configured to detect the vehicle entering the conveyer line; a plurality of tool detectors disposed along the conveyer line of the assembly line and configured to detect a position of an assembling tool on the conveyer line; an inertial sensor module installed in the assembling tool and configured to detect an angle and a displacement of the assembling tool for an assembling point of the vehicle and the assembling object; a tool controller configured to apply control signals corresponding to a predetermined assembling point of the vehicle and the assembling object, a kind of assembling element, and assembling torque of the assembling tool, to the assembling tool; and a main controller configured to acquire position information of the vehicle and the assembling tool and an angle and a displacement of the assembling tool through the vehicle detector, the tool detector, and the inertial sensor module to set the assembling point of the vehicle and the assembling object, the kind of assembling element, and the assembling torque of the assembling tool, transmit the set values to the tool controller, and receive and store a vehicle identification number of the vehicle, a kind of assembling element, and a result value of assembling torque of the assembling tool from the tool controller.

The vehicle detector may be installed at the vehicle entry side of the conveyer line, and include a barcode scanner that recognizes a barcode attached to the vehicle.

The barcode scanner may recognize the vehicle identification number of the vehicle entering the conveyer line, generate sequence information of the vehicle by using the vehicle identification number, and transmit the sequence information of the vehicle to the main controller.

The main controller may predict a moving speed of the assembling tool based on the position information of the assembling tool acquired from the tool detector and the displacement of the assembling tool acquired from the inertial sensor module, and set the moving speed as a moving speed of the conveyer line when the moving speed of the assembling tool is constant.

The main controller may acquire position information of the vehicle on the conveyer line based on the sequence information of the vehicles and the moving speed of the conveyer line.

The main controller may recognize the vehicle to which the assembling tool is close as an assembling object by using the position information of the vehicle and the position information of the assembling tool.

The main controller may determine a kind of assembling element by an angle value of the assembling tool acquired through the inertial sensor module, and sets assembling torque of the assembling tool.

The inertial sensor module may detect an angle, acceleration, and an angular velocity for the assembling tool.

An RFID tag periodically sending an ultra-wide band (UWB) signal may be installed in the assembling tool.

The tool detector may include an RFID sensor calculating a position of the assembling tool in real time by receiving the signal sent from the RFID tag.

The main controller may set an assembling point of the vehicle and the assembling object based on the displacement of the assembling tool acquired through the inertial sensor module.

The main controller may determine an assembling pattern of the assembling tool for the assembling points based on the displacement of the assembling tool acquired from the inertial sensor module, in the case of a plurality of assembling points of the vehicle and the assembling object.

Another exemplary embodiment of the present invention provides a control method of the joint guarantee system for vehicle assembly including a vehicle detector, a tool detector, an inertial sensor module, a tool controller, and a main controller, the control method including: recognizing a vehicle identification number of the vehicle by detecting the vehicle entering a conveyer line by the vehicle detector and generating sequence information of the vehicles by the vehicle identification number; detecting a position of the assembling tool on the conveyer line through the tool detector and detecting a displacement and an angle of the assembling tool through the inertial sensor module; acquiring position information of the vehicle by the displacement of the assembling tool acquired from the inertial sensor module and the sequence information of the vehicles; recognizing a vehicle to which the assembling tool is close based on the position information of the vehicle and the position information of the assembling tool acquired from the tool detector; acquiring position information of the vehicle and the assembling tool and an angle and a displacement of the assembling tool to set the assembling point of the vehicle and the assembling object, the kind of assembling element, and the assembling torque of the assembling tool and transmitting the set values to the tool controller; applying an assembling signal to the assembling tool to assemble the assembling element to the assembling point of the vehicle and the assembling object, by the tool controller; and receiving and storing a vehicle identification number of the vehicle, a kind of assembling element, and a result of assembling torque of the assembling tool from the tool controller.

The control method of the joint guarantee system for vehicle assembly may predict a moving speed of the assembling tool based on the position information of the assembling tool and the displacement of the assembling tool.

The control method of the joint guarantee system for vehicle assembly may set the moving speed as a moving speed of the conveyer line, when the moving speed of the assembling tool is constant.

The control method of the joint guarantee system for vehicle assembly may acquire position information of the vehicle on the conveyer line based on the sequence information of the vehicles and the moving speed of the conveyer line.

The control method of the joint guarantee system for vehicle assembly may determine an assembling pattern of the assembling tool for the assembling points based on the displacement of the assembling tool acquired from the inertial sensor module, in the case of a plurality of assembling points of the vehicle and the assembling object.

The control method of the joint guarantee system for vehicle assembly may double-integrate an acceleration value of the assembling tool acquired from the inertial sensor module to calculate a moving distance of the assembling tool.

The control method of the joint guarantee system for vehicle assembly may integrate an angular velocity value of the assembling tool acquired from the inertial sensor module to predict a moving path of the assembling tool.

The control method of the joint guarantee system for vehicle assembly may determine that the vehicle is unloaded from the conveyer line, in the case where the assembling of the assembling tool is implemented by comparing the position of the vehicle and the position of the assembling tool.

The control method of the joint guarantee system for vehicle assembly may transmit the vehicle identification number of the vehicle, the kind of assembling element, and the assembling result value of the assembling tool to a subsequent repair process.

The control method of the joint guarantee system for vehicle assembly may determine whether there is an assembling fault of the assembling element for each assembling point in the subsequent repair process.

The exemplary embodiments of the present invention may promote assembling history management having high effectiveness by precisely recognizing the positions of the vehicle and the assembling tool through the vehicle detector, the tool detector, and the inertial sensor module.

Further, in the exemplary embodiment of the present invention, even though the operator performs the operation in any order without following a predetermined operation order or performs the operation beyond the predetermined operation position, accurate assembling history management of the assembling result and the assembling object is possible.

Furthermore, in the exemplary embodiment of the present invention, the range of the assembling object may be divided by an assembling element unit from determination of a vehicle unit, and the assembling result is accurately matched with the assembling object and managed to contribute to improvement of assembling quality.

In addition, in the exemplary embodiment of the present invention, investment costs may be reduced by simplifying the system, and the work convenience may be enhanced by further expanding the range of the assembling operation.

BRIEF DESCRIPTION OF THE DRAWINGS

The drawings are intended to be used as references for describing the illustrative exemplary embodiments of the present invention, and the accompanying drawings should not be construed as limiting the technical spirit of the present invention.

DETAILED DESCRIPTION OF THE EMBODIMENTS

Figure 1:
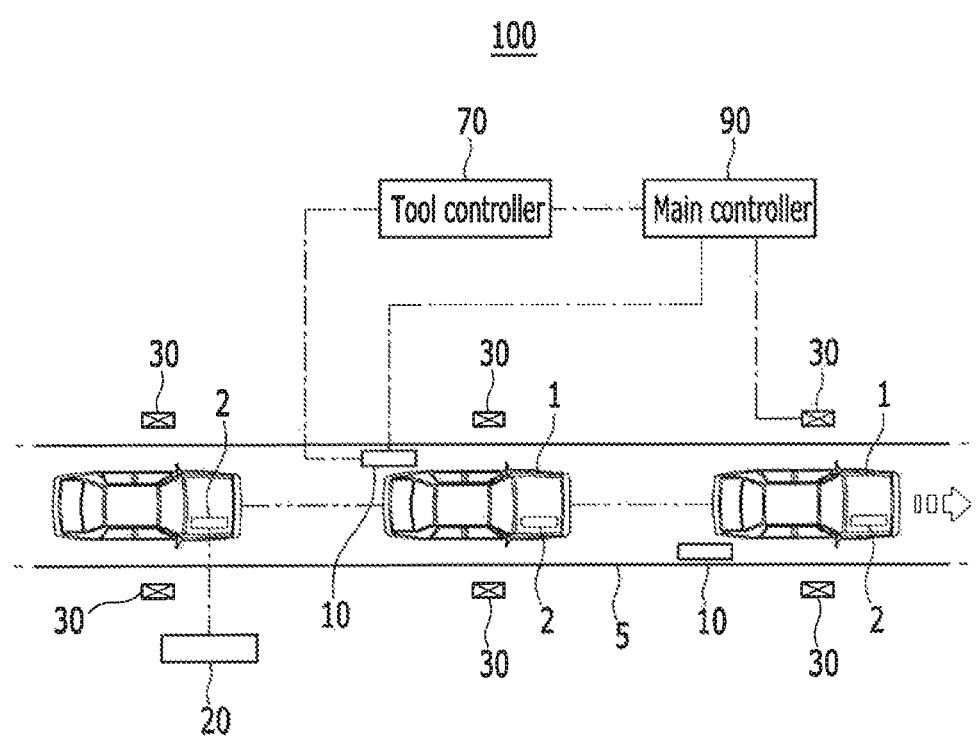
FIG. 1 is a diagram illustrating a joint guarantee system for vehicle assembly according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Parts which are not associated with the description are omitted in order to specifically describe the present invention, and like reference numerals refer to like elements throughout the specification.

The size and thickness of each component illustrated in the drawings are arbitrarily shown for understanding and ease of description, but the present invention is not limited thereto. Thicknesses of several portions and regions are enlarged for clear expressions.

Further, in the following detailed description, names of constituents, which are in the same relationship, are divided into "the first", "the second", and the like, but the present invention is not limited to the order in the following description.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 2:
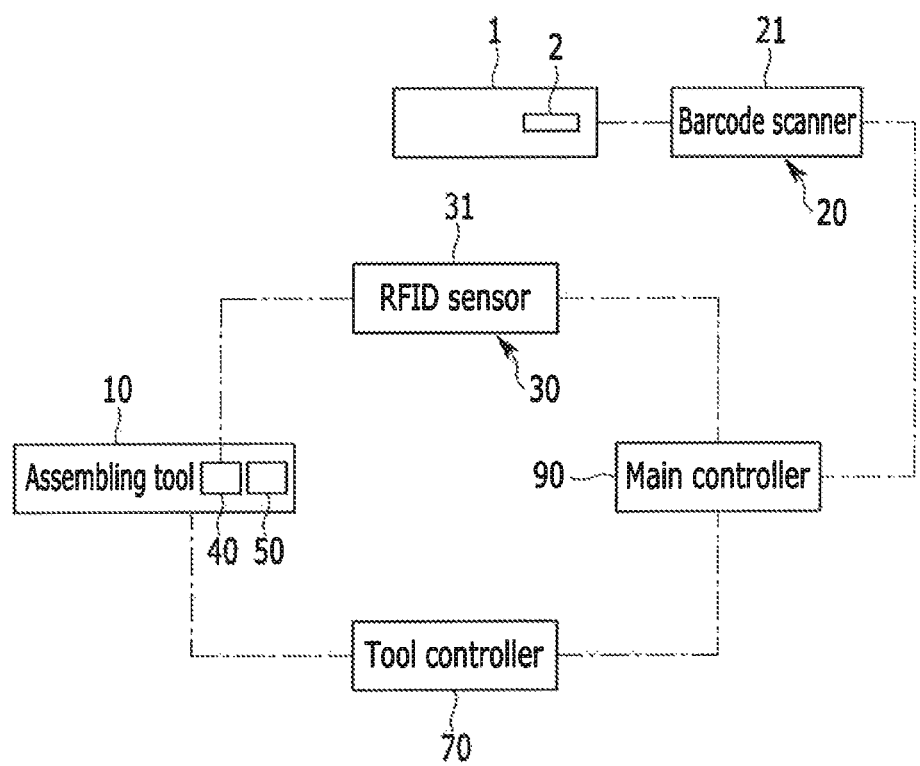
FIG. 2 is a block diagram of the joint guarantee system for vehicle assembly according to an exemplary embodiment of the present invention.

FIG. 1 is a diagram illustrating a joint guarantee system for vehicle assembly according to an exemplary embodiment of the present invention, and FIG. 2 is a block diagram of the joint guarantee system for vehicle assembly according to an exemplary embodiment of the present invention.

Referring to FIGS. 1 and 2, a joint guarantee system 100 for vehicle assembly according to an exemplary embodiment of the present invention may be applied to a vehicle assembly system of a vehicle production process that assembles a predetermined assembling component (hereinafter, referred to as an "assembling object") to a vehicle 1 which is carried at a predetermined interval.

For example, the exemplary embodiment of the present invention may be applied to a vehicle assembly line of assembling an assembling object 3 (see, e.g., FIG. 3) of a design component such as a brake pedal to the vehicle 1 during a design process among various processes of producing a complete vehicle.

According to the present invention, the joint guarantee system 100 can track positions for the vehicle 1 and an assembling tool 10 positioned in the corresponding process (for example, the design process) in real time and manage an assembling history of the assembling object 3 for the vehicle 1 by using the same.

As described herein, the vehicle 1 is carried to the corresponding process at the predetermined interval through a conveyer line 5, and the conveyer line 5 may include a conveyer belt device which is widely known in the art.

Figure 3:
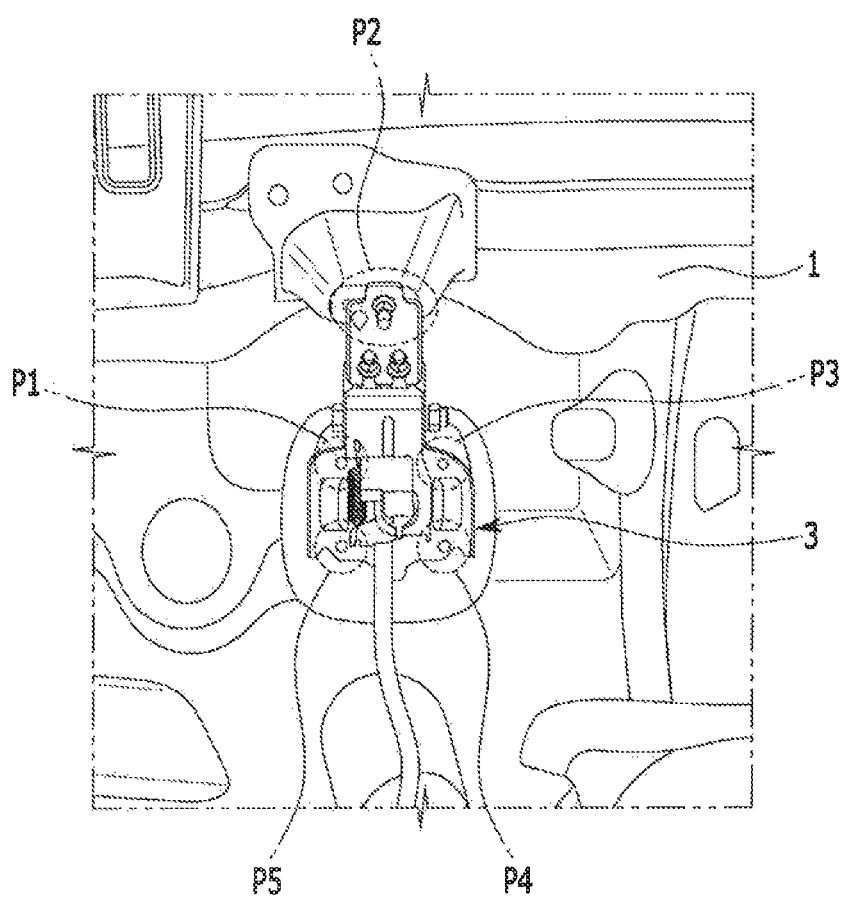
FIG. 3 is a diagram illustrating an example of assembling an assembling object to which the joint guarantee system for vehicle assembly according to an exemplary embodiment of the present invention is applied.

Referring to FIG. 3, an assembling portion of the vehicle 1 to which the assembling object 3 is assembled includes a plurality of assembling points P1 to P5 (for example, five points as shown in FIG. 3) requiring different assembling angles and assembling values.

In this case, at a first assembling point P1 of the assembling points P1 to P5 of the vehicle 1 and the assembling object 3, for example, an assembling angle of 23 degrees and an assembling value of a predetermined kgf are required, and at other assembling points P2 to P5, for example, an assembling angle of 90 degrees and an assembling value of a predetermined kgf may be required.

The assembling tool 10 applied to the exemplary embodiment of the present invention is an electric assembling mechanism for assembling a coupling member such as nuts to the assembling points P1 to P5 of the vehicle 1 and the assembling object 3, and may assemble the coupling member to each of the plurality of assembling points P1 to P5 by different assembling torque.

Figure 4:
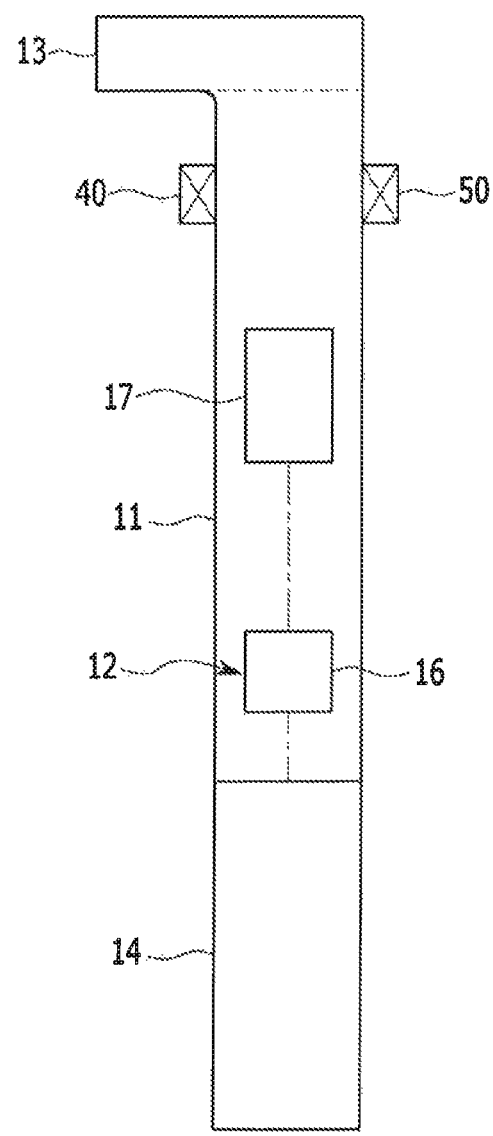
FIG. 4 is a diagram illustrating an assembling tool which is applied to the joint guarantee system for vehicle assembly according to an exemplary embodiment of the present invention.
Figure 5:
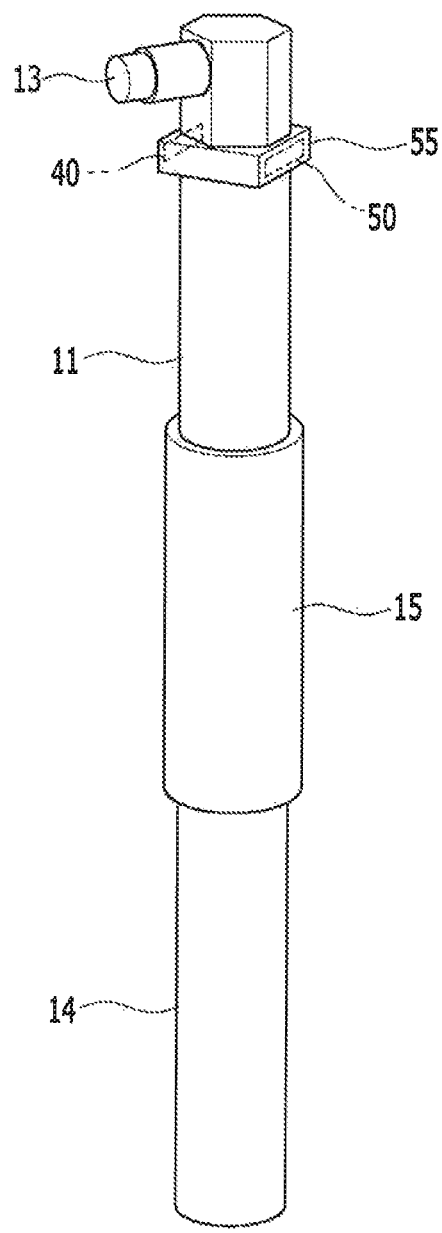
FIG. 5 is a perspective view illustrating an assembling tool which is applied to the joint guarantee system for vehicle assembly according to an exemplary embodiment of the present invention.

A plurality of assembling tools 10 may be disposed at predetermined points of the entire conveyer line 5, respectively. As illustrated in FIGS. 4 and 5, the assembling tool 10 includes a tool body 11 and a driving unit 12.

The tool body 11 configures a body of the electric assembling mechanism, and predetermined constituent elements may be mounted on the tool body 11. The tool body 11 may include accessory elements such as various colors, a blanket, and a support block for supporting the predetermined constituent elements.

However, since the accessory elements are to support various constituent elements, in the exemplary embodiment of the present invention, the accessory elements are commonly called the tool body 11 except for exceptional cases.

The tool body 11 may be formed as a cylindrical body, and the driving unit 12 may be configured therein.

An assembling portion 13 for assembling a coupling member (not illustrated) such as a bolt or a nut to the assembling points P1 to P5 of the vehicle 1 and the assembling object 3 is provided at one end (an upper portion in the drawing) of the tool body 11.

The assembling portion 13 includes a socket (not illustrated) supporting the assembling element, and the socket may be rotatable by the driving unit 12.

In addition, a power connection unit 14 for applying power to the driving unit 12 may be installed at the other end (a lower portion in the drawing) of the tool body 11, and the power connection unit 14 may be connected to external power, and a battery may be mounted therein.

A grip 15 to be held by an operator is installed at an approximately middle portion of the tool body 11. The grip 15 may be made of a rubber material or a plastic material.

The driving unit 12 is arranged to provide assembling torque (rotation force) to the assembling portion 13, and electrically connected with the power connection unit 14, mechanically connected with the assembling portion 13, and may be installed in the tool body 11.

The driving unit 12 includes a motor 16 generating rotation force, and a power transfer unit 17 transferring the rotation force of the motor 16 to the assembling portion 13.

Herein, the power transfer unit 17 may include, for example, a bevel drive gear and a bevel pinion gear (not illustrated) connecting the motor 16 and the assembling portion 13, and in addition, may include various gears transferring the rotation force of the motor 16 to a predetermined rotation body.

Since the power transfer unit 17 is well known in the art, a more detailed description for the configuration will be omitted in this specification.

The joint guarantee system 100 for vehicle assembly according to the exemplary embodiment of the present invention which may be applied to the design process of assembling the assembling object 3 to the vehicle 1 by using the carrying structure of the vehicle 1 and the assembling tool 10 is configured as a structure capable of promoting assembling history management, which can be highly effective, in particular, by precisely recognizing positions of the vehicle 1 and the assembling tool 10.

To this end, the joint guarantee system 100 for vehicle assembly according to the exemplary embodiment of the present invention, as illustrated in FIGS. 1 and 2, includes a vehicle detector 20, a tool detector 30, an inertial sensor module 50, a tool controller 70, and a main controller 90.

The vehicle detector 20 is arranged to detect the vehicle 1 entering the conveyer line 5 in the vehicle assembly line, and installed at the vehicle entry side of the conveyer line 5 in the vehicle assembly line.

The vehicle detector 20 may include a barcode scanner 21 that checks a vehicle identification number of the vehicle 1 by recognizing a barcode 2 attached to the vehicle 1.

Herein, the barcode scanner 21 may scan the barcode 2 of the vehicle 1 entering the conveyer line 5 to recognize the vehicle identification number of the vehicle 1, generate sequence information of the vehicle 1 by using the vehicle identification number, and transmit the sequence information of the vehicle 1 to the main controller 90.

The sequence information of each vehicle 1 (for example, of a plurality of vehicles 1) generated in the barcode scanner 21 may be used for calculating the positions of the vehicles 1 which are positioned on the conveyer line 5 in the main controller 90.

Since the barcode scanner 21 is formed as a barcode reader apparatus which is a widely known in the art, a more detailed description for the configuration will be omitted in this specification.

The tool detector 30 detects positions of the assembling tools 10 disposed on the conveyer line 5 and outputs a detection signal (detection value) to the main controller 90, and is disposed along the conveyer line 5 in the assembly line at a predetermined distance. For example, the tool detector 30 includes an RFID sensor 31.

In the exemplary embodiment of the present invention, in order to detect the positions of the assembling tools 10 through the RFID sensor 31, in the assembling tool 10, for example, an RFID tag 40 periodically sending an ultra-wide band (UWB) signal is installed.

In addition, at least three RFID sensors 31 are disposed in the assembly line along the conveyer line 5 at a predetermined interval. In this case, the signal sent from the RFID tag 40 is received by at least three RFID sensors 31, and may be used for calculating an accurate position of the assembling tool 10.

The RFID sensor 31 receives the UWB signal sent from the RFID tag 40 installed in the assembling tool 10 to calculate the position of the assembling tool in real time. In particular, the RFID sensor 31 receives the signal sent from the RFID tag 40 to be used for determining whether the assembling tool 10 is adjacent to any vehicle 1 on the conveyer line 5 at a predetermined time.

A radio-frequency identification (RFID) technique such as the RFID sensor 31 and the RFID tag 40 refers to a technique of recognizing information at a near range by using a radio wave.

Herein, the RFID tag 40 is configured by an antenna and an integrated circuit, and information is recorded in the integrated circuit, and the information is transmitted to a reader through the antenna. The information is used for identifying an object with the tag.

The inertial sensor module 50 is arranged to detect a displacement of the assembling tool 10 itself positioned on the conveyer line 5 and an angle and a displacement of the assembling tool for the assembling points P1 to P5 of the vehicle 1 and the assembling object 3.

The inertial sensor module 50 is installed in the tool body 11 of the assembling tool 10 as illustrated in FIGS. 4 and 5. For example, the inertial sensor module 50 detects an angle, an acceleration, and an angular velocity of the assembling tool 10, and may be installed at the assembling portion 13 side of the tool body 11 through an installation blanket 55.

The inertial sensor module 50 includes an angle sensor, an acceleration sensor, and an angular velocity sensor, and outputs information on the angle, the acceleration, and the angular velocity of the assembling tool 10 to the main controller 90, and the main controller 90 calculates a precise position of the assembling tool 10 by using the collected signal of the inertial sensor module 50.

The acceleration sensor and the angular velocity sensor detect the acceleration and the angular velocity according to the displacement of the assembling tool 10 in real time, when the assembling tool 10 moves through the conveyer line 5 or the operator moves with the assembling tool 10.

In addition, the angle sensor detects an angle of the assembling tool 10 fixed (mounted) at the assembling points P1 to P5 of the vehicle 1 and the assembling object 3, when coupling the coupling member such as a bolt or a nut by using the assembling tool 10. Herein, the angle sensor may include a light lever-type angle sensor measuring a slope of a predetermined object and a polarization type angle sensor.

Since the acceleration sensor, the angular velocity sensor, and the angle sensor are configured as an acceleration sensor, an angular velocity sensor, and an angle sensor which are widely known in the art, a more detailed description for the configuration will be omitted in this specification.

The tool controller 70 transmits, to the assembling tool 10, an operation setting value of the assembling tool 10 for the assembling points P1 to P5 of the vehicle 1 and the assembling object 3 which is set in the main controller 90 based on position information of the vehicle 1 and position information of the assembling tool 10 which are determined in real time through the vehicle detector 20, the tool detector 30, and the inertial sensor module 50.

In particular, the tool controller 70 applies, to the assembling tool 10, control signals corresponding to the assembling points P1 to P5 of the vehicle 1 and the assembling object 3 set in the main controller 90, a kind of assembling element, and assembling torque of the assembling tool 10.

Herein, the tool controller 70 may receive the operation setting value of the assembling tool 10 through real-time communication with the main controller 90, and correct the operation setting value of the assembling tool 10 in real time based on the received operation setting value.

Hereinabove, the main controller 90 is arranged to control the entire operation of the joint guarantee system 100 according to the exemplary embodiment of the present invention.

The main controller 90 acquires position information of the vehicle 1 and the assembling tool 10, and an angle and a displacement of the assembling tool 10 through the vehicle detector 20, the tool detector 30, and the inertial sensor module 50 to set the assembling points P1 to P5 of the vehicle 1 and the assembling object 3, a kind of assembling element, and assembling torque of the assembling tool 10, and transmits the set values to the tool controller 70.

In addition, when the assembling tool 10 receiving the control signals corresponding to the set values from the tool controller 70 assembles the assembling element to the assembling points P1 to P5 of the assembling object 3, the main controller 90 receives an assembling end signal from the tool controller 70.

Further, the main controller 90 receives the assembling end signal, and simultaneously, receives and stores the vehicle identification number of the vehicle 1, a kind of assembling element, and a result value of assembling torque of the assembling tool 10 from the tool controller 70.

Herein, the main controller 90 may predict a moving speed of the assembling tool 10 based on the position information of the assembling tool 10 acquired from the tool detector 30 and the displacement of the assembling tool 10 acquired from the inertial sensor module 50.

In this case, when the main controller 90 determines that the moving speed of the assembling tool 10 is uniform, the main controller 90 may set the moving speed as a moving speed of the conveyer line 5.

Accordingly, the main controller 90 may acquire position information of the vehicle 1 on the conveyer line 5 based on the sequence information of the vehicles 1 acquired from the vehicle detector 20 and the moving speed of the conveyer line 5.

In addition, the main controller 90 may recognize the vehicle 1 to which the assembling tool 10 is close on the conveyer line 5 as an assembling object by using the position information of the vehicle 1 and the position information of the assembling tool 10.

Meanwhile, the main controller 90 may determine a kind of assembling element by an angle value of the assembling tool 10 acquired through the inertial sensor module 50, and set assembling torque of the assembling tool 10.

Furthermore, the main controller 90 may set the assembling points P1 to P5 of the vehicle 1 and the assembling object 3 based on the displacement of the assembling tool 10 acquired through the inertial sensor module 50.

On the other hand, like the exemplary embodiment of the present invention, in the case of the plurality of assembling points P1 to P5 of the vehicle 1 and the assembling object 3, the main controller 90 may determine an assembling pattern of the assembling tool 10 for the assembling points P1 to P5 based on the displacement of the assembling tool 10 acquired through the inertial sensor module 50.

In particular, in the case of the plurality of assembling points P1 to P5 of the vehicle 1 and the assembling objet 3, the main controller 90 analyzes the assembling pattern of the assembling tool 10 for a detailed division of the assembling points P1 to P5.

In this case, the analyzing of the assembling pattern of the main control 90 may be implemented by double-integrating the acceleration value of the assembling tool 10 acquired from the inertial sensor module 50 to calculate a moving distance of the assembling tool 10, and integrating an angular velocity value of the assembling tool 10 acquired from the inertial sensor module 50 to predict a moving path of the assembling tool 10.

On the other hand, the main controller 90 may determine that the vehicle 1 is unloaded from the conveyer line 5, in the case where the assembling of the assembling tool is not implemented by comparing the position of the vehicle 1 and the position of the assembling tool 10.

In particular, the main controller 90 may recognize whether the vehicle 1 is removed due to a fault on the conveyer line 5 and the like, when there is no operation result of the assembling tool 10 for the vehicle 1 having a specific vehicle identification number.

In addition, the main controller 90 may transmit the vehicle identification number of the vehicle 1, a kind of assembling element, and an assembling result value of the assembling tool 10 received through the tool controller 70 to a subsequent repair process.

As a result, in the subsequent repair process, the main controller 90 may determine whether there is a fault of the assembling element for each assembling point of the vehicle 1 and the assembling object 3, and output an alarm for the assembling points P1 to P5 having the assembling fault.

Hereinafter, a control method of the joint guarantee system 100 for vehicle assembly according to the exemplary embodiment of the present invention which is configured above will be described in detail with reference to the above-illustrated drawings and the accompanying drawing.

Figure 6:
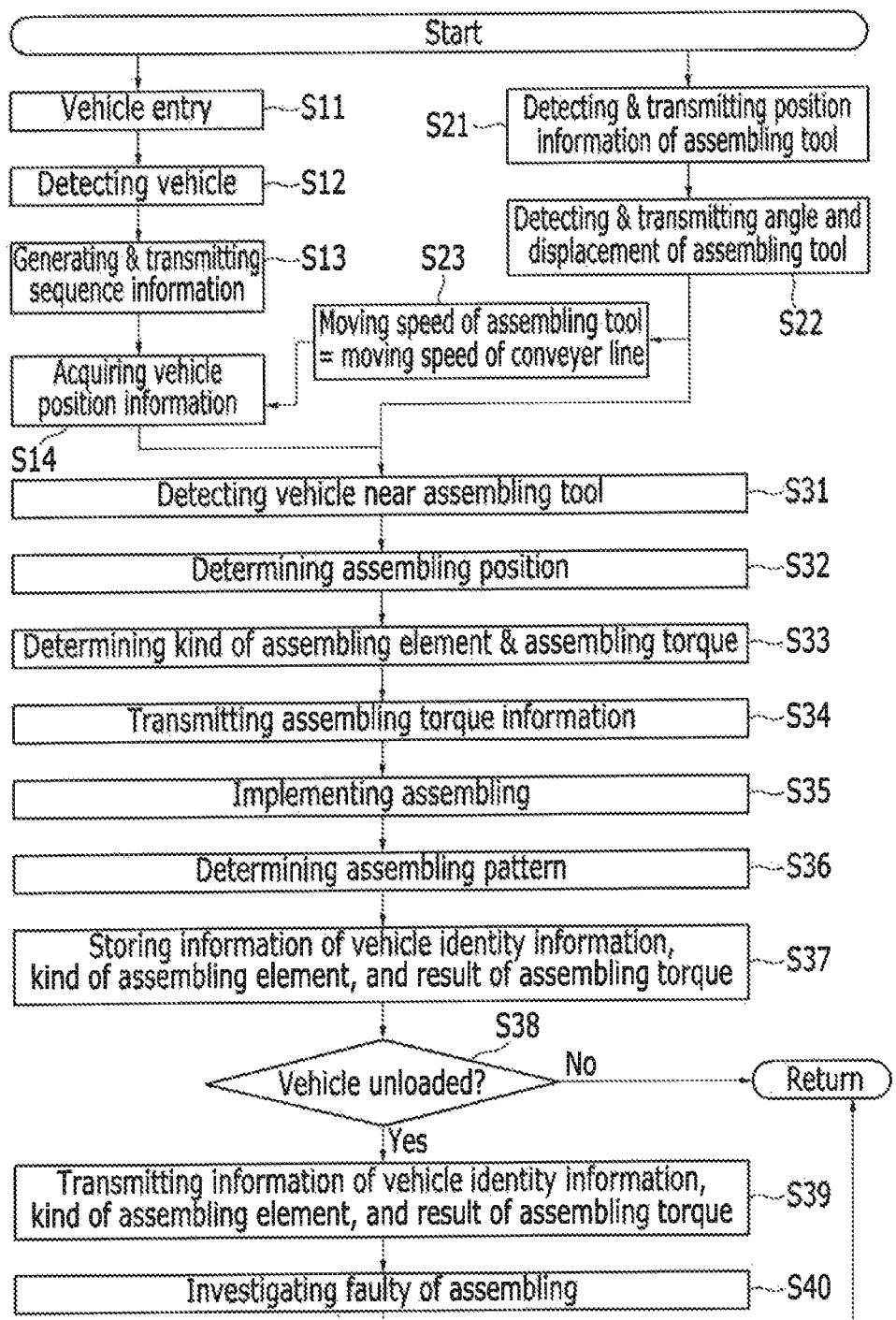
FIG. 6 is a flowchart for describing a control method of the joint guarantee system for vehicle assembly according to an exemplary embodiment of the present invention.

FIG. 6 is a flowchart for describing a control method of the joint guarantee system for vehicle assembly according to an exemplary embodiment of the present invention.

Referring to FIGS. 1 to 6, when the vehicle 1 enters the conveyer line 5 of the vehicle assembly line (step S11), the barcode scanner 21 of the vehicle detector 20 detects the vehicle 1 entering the conveyer line 5 from the vehicle entry side of the conveyer line 5 (step S12).

Herein, the barcode scanner 21 scans the barcode 2 attached to the vehicle 1 to recognize a vehicle identification number of the vehicle 1, generates sequence information of the vehicle 1 by using the vehicle identification number, and transmits the sequence information of the vehicle 1 to the main controller 90 (step S13).

In this process, in the exemplary embodiment of the present invention, the RFID sensor 31 of the tool detector 30 detects positions of the assembling tools 10 disposed on the conveyer line 5 (step S21).

In this case, the RFID sensor 31 receives an ultra-wide band (UWB) signal which is periodically sent from the RFID tag 40 attached to the assembling tool 10 to calculate the position of the assembling tool 10 in real time and transmits the position value to the main controller 90.

In addition, in the exemplary embodiment of the present invention, the inertial sensor module 50 installed in the assembling tool 10 detects an angle and a displacement of the assembling tool 10 and outputs a detection signal to the main controller 90 (step S22).

The inertial sensor module 50 outputs information on an angle, an acceleration, and an angular velocity for the assembling tool 10 through an angle sensor, an acceleration sensor, and an angular velocity sensor, to the main controller 90. Then, the main controller 90 receives the displacement of the assembling tool 10 from the inertial sensor module 50 to calculate a position of the assembling tool 10.

Meanwhile, in the exemplary embodiment of the present invention, the main controller 90 may predict a moving speed of the assembling tool 10 based on the position information of the assembling tool 10 and the displacement of the assembling tool 10 through the tool detector 30 and the inertial sensor module 50.

Herein, when the moving speed of the assembling tool 10 is uniform, the main controller 90 sets the moving speed of the assembling tool 10 as the moving speed of the conveyer line 5 (step S23).

The main controller 90 acquires position information of the vehicle 1 on the conveyer line 5 based on the sequence information of the vehicles 1 acquired from the vehicle detector 20 and the moving speed of the conveyer line 5 (step S4).

In addition, the main controller 90 recognizes the vehicle 1 to which the assembling tool 10 is close based on the position information of the vehicle 1 and the position information of the assembling tool 10 acquired from the tool detector 30 as described above (step S31).

Thereafter, in order that an operator performs the operation, when the assembling tool 10 is loaded at the assembling points P1 to P5 of the vehicle 1 and the assembling object 3, the main controller 90 sets the assembling points P1 to P5 of the vehicle 1 and the assembling object 3 based on the displacement (information on the angular velocity and the acceleration) of the assembling tool 10 acquired through the inertial sensor module 50 (step S32).

Further, the main controller 90 determines whether an angle value of the assembling tool 10 received from the inertial sensor module 50 is constant for a predetermined time, for example, as 0.5 second or more. As such, when the angle value of the assembling tool 10 is constant as 0.5 second or more, the main controller 90 determines that the assembling tool 10 is loaded at the assembling points P1 to P5 of the vehicle 1 and the assembling object 3.

Accordingly, the main controller 90 may determine a kind of assembling element by an angle value of the assembling tool 10 received through the inertial sensor module 50, and set the assembling torque of the assembling tool 10 suitable for the kind of assembling element (step S33).

As a result, the main controller 90 acquires position information of the vehicle 1 and the assembling tool 10, and an angle and a displacement of the assembling tool 10 to set the assembling points P1 to P5 of the vehicle 1 and the assembling object 3, a kind of assembling element, and assembling torque of the assembling tool 10, and transmits the set values to the tool controller 70 (step S34).

Then, the tool controller 70 applies, to the assembling tool 10, control signals corresponding to the assembling points P1 to P5 of the vehicle 1 and the assembling object 3, the kind of assembling element, and the assembling torque of the assembling tool 10 which are set in the main controller 90.

When an assembling start signal is applied to the assembling tool 10 through the tool controller 70, the assembling tool 10 may assemble the assembling element to the predetermined assembling points P1 to P5 of the vehicle 1 and the assembling object 3 by the set assembling torque (step S35).

In the exemplary embodiment of the present invention, in the case of the plurality of assembling points P1 to P5 of the vehicle 1 and the assembling object 3, the main controller 90 may determine an assembling pattern of the assembling tool 10 for the assembling points P1 to P5 based on the displacement (information on the angular velocity and the acceleration) of the assembling tool 10 acquired through the inertial sensor module 50 (step S36).

Herein, the main control 90 may determine the assembling pattern of the assembling tool 10 for the assembling points P1 to P5 by double-integrating the acceleration value of the assembling tool 10 acquired from the inertial sensor module 50 to calculate a moving distance of the assembling tool 10, and integrating an angular velocity value of the assembling tool 10 acquired from the inertial sensor module 50 to predict a moving path of the assembling tool 10.

As such, when the assembling element is assembled to the assembling points P1 to P5 of the vehicle 1 and the assembling objet 3 through the assembling tool 10, the tool controller 70 transmits an assembling end signal to the main controller 90.

Then, the main controller 90 receives and stores the vehicle identification number of the vehicle 1, the kind of assembling element, and the result value of assembling torque of the assembling tool 10 from the tool controller 70 (step S37).

Meanwhile, in the exemplary embodiment of the present invention, when the main controller 90 determines that the assembling of the assembling tool 10 is implemented by comparing the position of the vehicle 1 and the position of the assembling tool 10, the main controller 90 recognizes that the vehicle is unloaded from the conveyer line 5.

In particular, the main controller 90 recognizes that the vehicle 1 is removed due to a fault in the middle of the conveyer line 5, when there is no operation result of the assembling tool 10 corresponding to the specific vehicle identification number of the vehicle 1 (step S38).

On the other hand, in the exemplary embodiment of the present invention, the main controller 90 transmits the vehicle identification number of the vehicle 1, the kind of assembling element, and the assembling result value of the assembling tool 10 received through the tool controller 70 to a subsequent repair process (step S39).

Then, in the subsequent repair process, the main controller 90 may investigate whether there is an assembling fault of the assembling element for each assembling point of the vehicle 1 and the assembling object 3 (step S40), and output an alarm for the assembling points P1 to P5 having the assembling fault.

As described above, the joint guarantee system 100 for vehicle assembly according to the exemplary embodiment of the present invention may promote assembling history management having high effectiveness by precisely recognizing the positions of the vehicle 1 and the assembling tool 10 through the vehicle detector 20, the tool detector 30, and the inertial sensor module 50.

Further, in the exemplary embodiment of the present invention, in the case where the operator performs the operation in any order without following a predetermined operation order or performs the operation beyond the predetermined operation position, accurate assembling history management of the assembling result and the assembling object can be obtained.

Furthermore, in the exemplary embodiment of the present invention, the range of the assembling object may be divided by an assembling element unit in determination of a vehicle unit, and the assembling result is accurately matched with the assembling object and managed to contribute to improvement of assembling quality.

In addition, in the exemplary embodiment of the present invention, investment costs may be reduced by simplifying the system, and the work convenience may be enhanced by further expanding the range of the assembling operation.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A joint guarantee system for vehicle assembly in a vehicle assembly line that assembles an assembling object to a vehicle carried through a conveyer line, the joint guarantee system comprising:
   a vehicle detector installed in the assembly line and configured to detect the vehicle entering the conveyer line;
   a plurality of tool detectors disposed along the conveyer line of the assembly line configured to detect a position of an assembling tool on the conveyer line;
   an inertial sensor module installed in the assembling tool and configured to detect an angle and a displacement of the assembling tool for an assembling point of the vehicle and the assembling object, the inertial sensor module further detecting an acceleration and an angular velocity of the assembling tool;
   a tool controller configured to apply control signals corresponding to a predetermined assembling point of the vehicle and the assembling object, a type of coupling member, and assembling torque of the assembling tool, to the assembling tool; and
   a main controller configured to acquire position information of the vehicle and the assembling tool and the angle and the displacement of the assembling tool through the vehicle detector, the tool detector, and the inertial sensor module to set the assembling point of the vehicle and the assembling object, the type of coupling member, and the assembling torque of the assembling tool, transmit the set values to the tool controller, and receive and store a vehicle identification number of the vehicle, the type of coupling member, and a result value of assembling torque of the assembling tool from the tool controller, wherein the main controller determines the type of coupling member by the angle of the assembling tool obtained from the inertial sensor module, and sets the assembling torque of the assembling tool.

2. The joint guarantee system of claim 1, wherein:
the vehicle detector is installed at a vehicle entry side of the conveyer line, and includes a barcode scanner that recognizes a barcode attached to the vehicle.

3. The joint guarantee system of claim 2, wherein:
the barcode scanner recognizes the vehicle identification number of the vehicle entering the conveyer line, generates a sequence information of the vehicle by using the vehicle identification number, and transmits the sequence information of the vehicle to the main controller.

4. The joint guarantee system of claim 3, wherein:
the main controller predicts a moving speed of the assembling tool based on the position information of the assembling tool acquired from the tool detector and the displacement of the assembling tool acquired from the inertial sensor module, and sets the moving speed as a moving speed of the conveyer line, when the moving speed of the assembling tool is constant.

5. The joint guarantee system of claim 4, wherein:
the main controller acquires position information of the vehicle on the conveyer line based on the sequence information of the vehicles and the moving speed of the conveyer line.

6. The joint guarantee system of claim 5, wherein:
the main controller recognizes the vehicle to which the assembling tool is close as the assembling object by using the position information of the vehicle and the position information of the assembling tool.

7. The joint guarantee system of claim 1, wherein:
an RFID tag periodically sending an ultra-wide band (UWB) signal is installed in the assembling tool.

8. The joint guarantee system of claim 7, wherein:
the tool detector includes an RFID sensor calculating a position of the assembling tool in real time by receiving the signal sent from the RFID tag.

9. The joint guarantee system of claim 1, wherein:
the main controller sets the assembling point of the vehicle and the assembling object based on the displacement of the assembling tool acquired through the inertial sensor module.

10. The joint guarantee system of claim 1, wherein:
the main controller, in the case of a plurality of assembling points of the vehicle and the assembling object, determines an assembling pattern of the assembling tool for the assembling points based on the displacement of the assembling tool acquired through the inertial sensor module.

11. A control method of a joint guarantee system for a vehicle assembly including a vehicle detector, a tool detector, an inertial sensor module, a tool controller, and a main controller, the control method comprising:
   recognizing a vehicle identification number of the vehicle by detecting the vehicle entering a conveyer line by the vehicle detector and generating sequence information of vehicles by the vehicle identification number;
   detecting a position of the assembling tool on the conveyer line through the tool detector and detecting a displacement and an angle of the assembling tool through the inertial sensor module;
   acquiring position information of the vehicle by the displacement of the assembling tool acquired from the inertial sensor module and the sequence information of the vehicles, the inertial sensor module further configured to detect an acceleration and an angular velocity of the assembling tool;
   recognizing a vehicle to which the assembling tool is close based on the position information of the vehicle and the position information of the assembling tool acquired from the tool detector, by the main controller;
   acquiring position information of the vehicle and the assembling tool, and an angle and a displacement of the assembling tool to set the assembling point of the vehicle and the assembling object, a type of coupling member, and an assembling torque of the assembling tool and transmitting the set values to the tool controller, by the main controller, wherein the main controller determines the type of coupling member by the angle of the assembling tool obtained from the inertial sensor module, and sets the assembling torque of the assembling tool;
   applying an assembling signal to the assembling tool to assemble the coupling member to the assembling point of the vehicle and the assembling object, by the tool controller; and
   receiving and storing a vehicle identification number of the vehicle, the type of coupling member, and a result of the assembling torque of the assembling tool from the tool controller, by the main controller.

12. The control method of claim 11, wherein:
the main controller predicts a moving speed of the assembling tool based on the position information of the assembling tool and the displacement of the assembling tool.

13. The control method of claim 12, wherein:
when the moving speed of the assembling tool is constant, the main controller sets the moving speed as a moving speed of the conveyer line.

14. The control method of claim 13, wherein:
the main controller acquires position information of the vehicle on the conveyer line based on the sequence information of the vehicles and the moving speed of the conveyer line.

15. The control method of claim 11, wherein:
in the case of a plurality of assembling points of the vehicle and the assembling object,
the main controller determines an assembling pattern of the assembling tool for the assembling points based on the displacement of the assembling tool acquired through the inertial sensor module.

16. The control method of claim 15, wherein:
the main controller double-integrates an acceleration value of the assembling tool acquired from the inertial sensor module to calculate a moving distance of the assembling tool, and
the main controller integrates an angular velocity value of the assembling tool acquired from the inertial sensor module to predict a moving path of the assembling tool.

17. The control method of claim 11, wherein:
the main controller determines that the vehicle is unloaded from the conveyer line, in the case where the assembling of the assembling tool is not implemented by comparing the position of the vehicle and the position of the assembling tool.

18. The control method of claim 11, wherein:
the main controller transmits the vehicle identification number of the vehicle, the type of coupling member, and the assembling result value of the assembling tool to a subsequent repair process.

* * * * *